United States Patent
Griffin et al.

(10) Patent No.: US 12,141,298 B1
(45) Date of Patent: *Nov. 12, 2024

(54) ROLE-BASED OBJECT IDENTIFIER SCHEMA

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,372

(22) Filed: Dec. 5, 2022

Related U.S. Application Data

(63) Continuation of application No. 16/809,419, filed on Mar. 4, 2020, now Pat. No. 11,520,909.

(51) Int. Cl.
*G06F 21/60* (2013.01)
*G06F 21/62* (2013.01)
*H04L 9/40* (2022.01)

(52) U.S. Cl.
CPC ........ *G06F 21/604* (2013.01); *G06F 21/6218* (2013.01); *H04L 63/102* (2013.01); *G06F 2221/2141* (2013.01)

(58) Field of Classification Search
CPC .............. G06F 21/604; G06F 21/6218; G06F 2221/2141; H04L 63/102
See application file for complete search history.

(56) References Cited

U.S. PATENT DOCUMENTS

| | | | | |
|---|---|---|---|---|
| 6,014,666 A | * | 1/2000 | Helland | G06F 21/6218 707/999.009 |
| 6,574,736 B1 | * | 6/2003 | Andrews | G06F 9/468 709/227 |
| 7,702,693 B1 | * | 4/2010 | Aiyagari | G06F 21/6218 707/783 |
| 7,921,452 B2 | * | 4/2011 | Ridlon | G06F 21/604 726/1 |
| 8,136,147 B2 | * | 3/2012 | Koikara | G06F 21/604 726/17 |
| 8,291,490 B1 | * | 10/2012 | Ahmed | G06F 21/604 726/20 |
| 8,713,642 B2 | * | 4/2014 | Estrada | H04L 63/08 726/4 |
| 8,874,902 B2 | * | 10/2014 | Ackerly | G06F 21/6218 713/155 |
| 9,280,646 B1 | * | 3/2016 | Nandyalam | G06F 21/6218 |
| 10,032,039 B1 | * | 7/2018 | Milman | G06F 21/6209 |
| 10,061,932 B1 | * | 8/2018 | Combs | H04N 1/4486 |
| 10,805,282 B2 | * | 10/2020 | Allrich | H04L 51/224 |
| 11,100,245 B1 | * | 8/2021 | Littler | G06F 21/6218 |

(Continued)

*Primary Examiner* — Jason Chiang
(74) *Attorney, Agent, or Firm* — Foley & Lardner LLP

(57) ABSTRACT

A method includes receiving a first user request to access or modify a first application, the first user request including a first object identifier (OID), the first OID identifying a first role of the first user. The method further includes determining whether the first OID is equivalent to a first application-specific role, and in response to determining that the first OID is equivalent to the first application-specific role, authorizing the first user request.

20 Claims, 5 Drawing Sheets

(56) References Cited

U.S. PATENT DOCUMENTS

| | | | | |
|---|---|---|---|---|
| 11,122,050 B2* | 9/2021 | Badawy | | G06F 21/45 |
| 2002/0095571 A1* | 7/2002 | Bradee | | G06F 21/6236 |
| | | | | 713/164 |
| 2003/0163513 A1* | 8/2003 | Schaeck | | G06Q 30/02 |
| | | | | 709/201 |
| 2004/0083367 A1* | 4/2004 | Garg | | G06F 21/6218 |
| | | | | 713/170 |
| 2005/0015775 A1* | 1/2005 | Russell | | G06F 9/466 |
| | | | | 719/315 |
| 2007/0157311 A1* | 7/2007 | Meier | | G06F 21/577 |
| | | | | 726/22 |
| 2007/0230706 A1* | 10/2007 | Youn | | H04L 63/06 |
| | | | | 380/277 |
| 2008/0022370 A1* | 1/2008 | Beedubail | | H04L 63/101 |
| | | | | 726/4 |
| 2008/0313716 A1* | 12/2008 | Park | | G06F 21/604 |
| | | | | 726/4 |
| 2009/0025063 A1* | 1/2009 | Thomas | | G06F 21/6218 |
| | | | | 726/4 |
| 2009/0083390 A1* | 3/2009 | Abu-Ghazaleh | | H04L 47/70 |
| | | | | 709/209 |
| 2009/0187440 A1* | 7/2009 | Sreevas | | G06Q 10/00 |
| | | | | 705/75 |
| 2009/0282240 A1* | 11/2009 | Zhou | | H04L 63/101 |
| | | | | 709/229 |
| 2010/0011438 A1* | 1/2010 | Bartley | | G06F 21/6218 |
| | | | | 726/17 |
| 2011/0277017 A1* | 11/2011 | Ivanov | | H04L 63/08 |
| | | | | 726/4 |
| 2012/0042362 A1* | 2/2012 | Vlasov | | G06F 21/604 |
| | | | | 726/4 |
| 2012/0084869 A1* | 4/2012 | Bilaney | | G06F 21/335 |
| | | | | 726/27 |
| 2012/0131646 A1* | 5/2012 | Chandolu | | G06F 21/6218 |
| | | | | 726/4 |
| 2012/0158657 A1* | 6/2012 | Bernstein | | G06F 8/71 |
| | | | | 707/634 |
| 2012/0216240 A1* | 8/2012 | Gottumukkala | | G06F 21/6218 |
| | | | | 726/1 |
| 2013/0329738 A1* | 12/2013 | Yamagata | | H04L 63/20 |
| | | | | 370/392 |
| 2014/0109168 A1* | 4/2014 | Ashley | | H04L 63/20 |
| | | | | 726/1 |
| 2014/0282997 A1* | 9/2014 | Norton | | H04L 63/0823 |
| | | | | 726/10 |
| 2016/0098572 A1* | 4/2016 | Povalyayev | | H04L 63/102 |
| | | | | 726/28 |
| 2018/0337915 A1* | 11/2018 | Tewari | | G06F 9/5038 |
| 2019/0005258 A1* | 1/2019 | Signäs | | H04L 9/3226 |
| 2019/0228176 A1* | 7/2019 | Fishbeck | | H04L 9/0816 |
| 2019/0278922 A1* | 9/2019 | Levin | | G06F 21/604 |
| 2020/0007555 A1* | 1/2020 | Jadhav | | H04L 67/1097 |
| 2020/0026870 A1* | 1/2020 | Bagley, Jr. | | G06F 21/32 |
| 2020/0110833 A1* | 4/2020 | Shivamoggi | | G06Q 10/06313 |
| 2020/0210599 A1* | 7/2020 | Akers | | H04L 51/02 |
| 2020/0311031 A1* | 10/2020 | Sim-Tang | | G06F 21/6245 |
| 2020/0334599 A1* | 10/2020 | Zayats | | G06N 3/047 |
| 2021/0036860 A1* | 2/2021 | Ranganathan | | H04L 63/102 |
| 2021/0174350 A1* | 6/2021 | Hena | | H04L 9/0833 |
| 2021/0224409 A1* | 7/2021 | Avanes | | G06F 16/21 |

* cited by examiner

X9-RBOID ::= {X9-RBOID 3 133 16 840 9 n}  — 602

ISO-RBOID ::= {ISO-RBOID 3 133 17 n}  604   — 606

JOINT-RBOID::= {JOINT-ISO-ITU(2) 16 840 1 114171 n}

COMPANY-RBOID::= {COMPANY 16 840 1 114171 n}   608

| Role | Value |
|---|---|
| IT Administrator | RBOIDS(3) |
| SE Adminstrator | RBOIDS(4) |
| IS Administrator | RBOIDS(5) |
| User | RBOIDS(6) |

FIG. 7

ROLE-BASED OBJECT IDENTIFIER SCHEMA

CROSS-REFERENCE TO RELATED APPLICATIONS

This application is a continuation of U.S. patent application Ser. No. 16/809,419, filed Mar. 4, 2020, which is incorporated herein by reference in its entirety and for all purposes.

BACKGROUND

With role-based access control (RBAC) systems, separation of duties can be enforced by assigning individuals to pre-defined roles such that privileges are properly managed. For example, a system administrator might manage the hardware and operating system for a particular server, but not the applications running on that server. At the same time, an application administrator might manage the application software but not have access to the hardware or operating systems. As another example, an information technology (IT) administrator might manage the hardware, firmware, and software for a cryptographic hardware security module (HSM), but an information security (IS) administrator might manage the cryptographic keys within the HSM. Other systems might separate the approver who grants administrator privileges to an individual but the approver cannot also be an administrator.

With human resources (HR) systems, often the job title within an organization (e.g., "staff," "manager," "VP," "SVP," "CEO," and so on) might determine benefits, privileges, and legal responsibilities. Job titles often define the salary range for a given job function. However, job titles vary greatly across industries, across companies within the same industry, and even in different geographical areas for the same company. For example a certified public account (CPA) in the USA is equivalent to a chartered accountant (CA) in Canada.

SUMMARY

In one arrangement, a method includes receiving a first user request to access or modify a first application, the first user request including a first object identifier (OID), the first OID identifying a first role of the first user. The method further includes determining whether the first OID is equivalent to a first application-specific role, and in response to determining that the first OID is equivalent to the first application-specific role, authorizing the first user request.

In another arrangement, a method includes receiving a first request from a first user to access or modify a first application, the first user request including a first OID, the first OID identifying a first role of the user. The method further includes receiving a second request from the first user to access or modify a second application, the second user request including a second OID, the second OID identifying a second role of the first user. A determination is made as to whether the first user is permitted to access the first application and the second application. In response to determining that the first user is not permitted to access the first application and the second application, the first user is denied access to the first application and the second application.

In yet another arrangement, a non-transitory computer readable media includes computer-executable instructions embodied therein that, when executed by at least one processor of a computing system, cause the computing system to attempt to verify a user using a schema. The schema includes a first OID corresponding to a first application-specific role and a second application-specific role. The schema further includes a second OID corresponding to a third application-specific role and a fourth application specific role.

These and other features, together with the organization and manner of operation thereof, will become apparent from the following detailed description when taken in conjunction with the accompanying drawings.

BRIEF DESCRIPTION OF THE DRAWINGS

FIG. 6 is an illustration of the format of various RBOIDs, according to various arrangements.

FIG. 7 is an illustration of a table of various example RBOIDs and the roles to which they are mapped, according to various arrangements.

DETAILED DESCRIPTION

Referring generally to the FIGS., apparatuses, systems, methods, and non-transitory computer-readable media described herein relate to RBOIDs. In arrangements described herein, RBOIDs enable a generic role-based identification schema using OIDs that can be applied to any role-based job description strategy, such as role-based access control systems, HR benefits, reward programs, etc. With HR systems, often the job title within an organization (e.g., "staff," "manager," "vice president," "senior vice president," "chief executive officer," etc.) are basis for determining benefits, privileges, and legal responsibilities. Job titles often define the salary range for a given job function. However, job titles vary greatly across industries, across companies within the same industry, and even in different geographical areas for the same company. A RBOID offers a globally unique identifier based on an industry standard or other private allocation.

The RBOID schema described herein provides the ability to implement one security policy that can be enforced across various applications that reference different role names, where the different role names define substantially the same functions and/or responsibilities. Accordingly, a separate security policy does not need to be implemented for each application based on the role names defined in each application.

Figure 1:
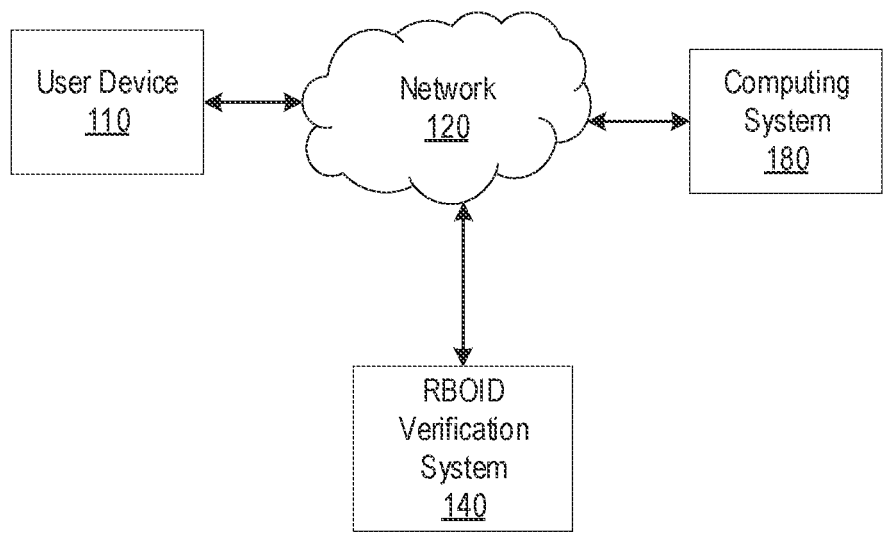
FIG. 1 is a block diagram of a system for verifying a role, according to some arrangements.

FIG. 1 is a block diagram of a system for verifying a role, according to some arrangements. The system 100 includes at least a user device 110, a RBOID verification system 140, a computing system 180, and a network 120. Each of the user device 110, the RBOID verification system 140, and the computing system 180 is a computing system having processing, storage, and networking capabilities for verifying a RBOID. In some arrangements, one or all of the user device 110, the RBOID verification system 140, and the computing system 180 can be an Internet connected computing device (e.g., a computer, smartphone, etc.). In some arrangements, the RBOID verification system 140 can be any network-connected (e.g., Internet connected) device that has a network address (e.g., a computer, smartphone, etc.) that is capable of verifying a RBOID. In particular, the RBOID verification system 140 can determine if a RBOID corresponds to a defined role. The computing system 180 can allow the user device 110 access to various applications based on the determination of the RBOID verification system 140.

Various levels of access to the various applications can be provided based on the determination of the RBOID verification system 140. For example, an RBOID corresponding to a relatively low-level role may be provided a low level of access (e.g., the ability to modify permissions on a specific application), and an RBOID corresponding to a relatively high-level role may be provided a higher level of access (e.g., the ability to install and/or delete various applications).

The user device 110 can include any type of device capable of communicating with the computing system 180 and the RBOID verification system 140. Examples of the user device 110 include, but are not limited to, a mobile device, a smartphone, a laptop computer, a tablet computer, a desktop computer, a smartwatch, and the like.

The RBOID verification system 140 is a system that can verify a RBOID the user device 110 presents to the computing system 180 when the user device 110 attempts to access at least a portion of the computing system 180. The RBOID verification system 140 receives information from the user device 110 and the computing system 180 via the network 120. In some arrangements where the information received by the RBOID verification system 140 indicates that the user device 110 should be allowed to access the computing system 180, the RBOID verification system 140 notifies the computing system 180 that the user device 110 can access the computing system 180. In some arrangements where the information received by the RBOID verification system 140 indicates that the user device 110 should not be allowed to access the computing system 180, the RBOID verification system 140 notifies the computing system 180 that the user device 110 cannot access the computing system 180.

The computing system 180 can include any type of device or system configured to execute one or more software applications. In some arrangements, the computing system 180 can include an operating system (e.g., Windows, Linux, MAC OS, etc.).

The network 120 is any suitable Local Area Network (LAN), Wide Area Network (WAN), or a combination thereof. For example, the network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 120 is structured to permit the exchange of data, values, instructions, messages, and the like.

Figure 2:
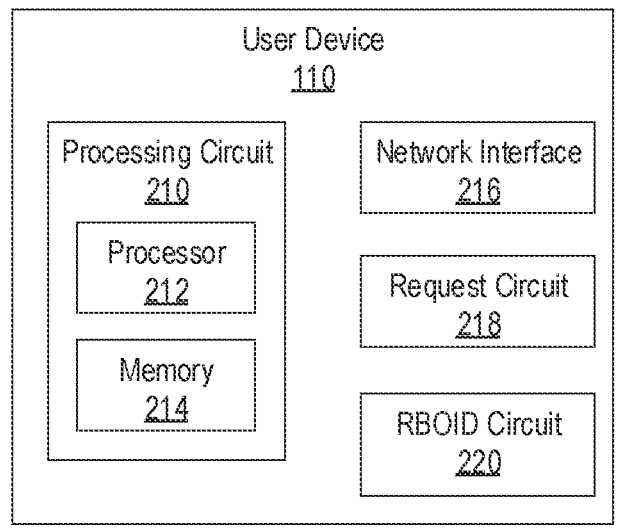
FIG. 2 is a block diagram of an example of the user device of the system set forth in FIG. 1, according to some arrangements.

FIG. 2 is a block diagram of an example of the user device of the system set forth in FIG. 1, according to some arrangements. Referring to FIGS. 1-2, the user device 110 is shown to include various circuits for logic implementing the operations described herein. More particularly, the user device 110 includes one or more of a processing circuit 210, a network interface 216, a request circuit 218, and a RBOID circuit 220. While various circuits, interfaces, and logic with particular functionality are shown, it should be understood that the user device 110 includes any number of circuits, interfaces, and logic for facilitating the operations described herein. For example, the activities of multiple circuits are combined as a single circuit and implemented on the same processing circuit (e.g., the processing circuit 210), as additional circuits with additional functionality are included.

In some arrangements, the user device 110 includes a processing circuit 210 having a processor 212 and a memory 214. The processor 212 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 214 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 214 is or includes tangible, non-transient volatile memory or non-volatile memory. Accordingly, the memory 214 includes database components, object code components, script components, or any other type of information structure for supporting the various activities and information structures described herein.

The network interface 216 is configured for and structured to establish a connection with the computing system 180 and the RBOID verification system 140 via the network 120. The network interface 216 is structured for sending and receiving data over a communication network (e.g., the network 120). Accordingly, the network interface 216 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The request circuit 218 is executed by the processing circuit 210, in some arrangements. The request circuit 218 can request access to the computing system 180 and/or one or more applications executed by the computing system 180. The request circuit 218 can be provided in various manners. In some arrangements, the request circuit 218 is a server-based application that is executable on the computing system 180. In this regard, the request circuit 218 is downloaded prior to usage. In some arrangements, the request circuit 218 is a web-based interface application provided by the RBOID verification system 140. In this configuration, the user logs onto or otherwise accesses the web-based interface before usage. In this regard, the request circuit 218 is provided to the user device 110. In some arrangements, the request circuit 218 is coded into the memory 214 of the user device 110. All such variations and combinations are intended to fall within the spirit and scope of the present disclosure.

The request circuit 218 is operatively coupled to one or more of the components of the user device 110. For example, the request circuit 218 is operatively coupled to the network interface 216 for communicating with the computing system 180 and the RBOID verification system 140. The request circuit 218, as facilitated by the network interface 216, can send an access request to the computing system 180. In some arrangements, the request circuit 218 is coupled to an input/output device to display output and receive user input.

The RBOID circuit 220 is executed by the processing circuit 210, in some arrangements. The RBOID circuit 220 can store and/or manage one or more RBOIDs associated with the user device 110. For example, the RBOID circuit 220 can store a first RBOID associated with a first application executed by the computing system 180, and the RBOID circuit 220 can store a second RBOID associated with a second application executed by the computing system 180.

The RBOID circuit 220 is operatively coupled to one or more of the components of the user device 110. For example, the RBOID circuit 220 is operatively coupled to the network interface 216 for communicating with the computing system 180 and the RBOID verification system 140. The RBOID circuit 220, as facilitated by the network interface 216, can send one or more RBOIDs to the computing system 180 for verification purposes.

Figure 3:
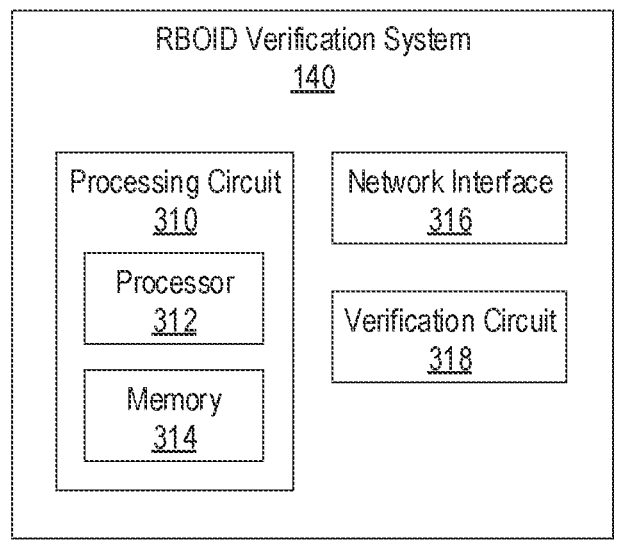
FIG. 3 is a block diagram of an example of the role-based OID (RBOID) verification system of the system set forth in FIG. 1, according to some arrangements.

FIG. 3 is a block diagram of an example of the RBOID verification system 140 of the system set forth in FIG. 1, according to some arrangements. Referring to FIGS. 1 and 3, the RBOID verification system 140 is shown to include various circuits and logic for implementing the operations described herein. More particularly, the RBOID verification system 140 includes one or more of a processing circuit 310, a network interface 316, and a verification circuit 318. While various circuits, interfaces, and logic with particular functionality are shown, it should be understood that the RBOID verification system 140 includes any number of circuits, interfaces, and logic for facilitating the operations described herein. For example, the activities of multiple circuits are combined as a single circuit and implement on the same processing circuit (e.g., the processing circuit 310), as additional circuits with additional functionality are included.

In some arrangements, the RBOID verification system 140 includes a processing circuit 310 having a processor 312 and a memory 314. The processor 312 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 314 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 314 is or includes tangible, non-transient volatile memory or non-volatile memory. Accordingly, the memory 314 includes database components, object code components, script components, or any other type of information structure for supporting the various activities and information structures described herein.

The network interface 316 is configured for and structured to establish a connection with the user device 110 and the computing system 180 via the network 120. The network interface 316 is structured for sending and receiving data over a communication network (e.g., the network 120). Accordingly, the network interface 316 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The verification circuit 318 is executed by the processing circuit 310, in some arrangements. The verification circuit 318 can receive access information from both the user device 110 and the computing system 180 and determine if access should be granted. For example, in some arrangements the verification circuit 318 can receive a request for access initiated by the user device 110 and sent to the computing system 180. The access request can include a RBOID associated with the request. The verification circuit 318 can subsequently receive a response to the request from the computing system 180, and the response can include a RBOID associated with the response. The verification circuit 318 compares the RBOIDs received from the user device 110 and the computing system 180. If the RBOIDs match, the verification circuit 318 approves the request for access. If the RBOIDs do not match, the verification circuit 318 does not approve the request for access.

Figure 4:
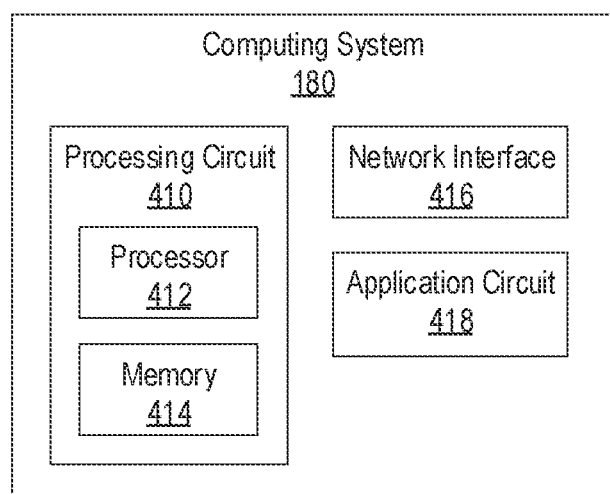
FIG. 4 is a block diagram of an example of the computing system of the system set forth in FIG. 1, according to some arrangements.

FIG. 4 is a block diagram of an example of the computing system 180 of the system set forth in FIG. 1, according to some arrangements. Referring to FIGS. 1 and 4, the computing system 180 is shown to include various circuits and logic for implementing the operations described herein. More particularly, the computing system 180 includes one or more of a processing circuit 410, a network interface 416, and an application circuit 418. While various circuits, interfaces, and logic with particular functionality are shown, it should be understood that the computing system 180 includes any number of circuits, interfaces, and logic for facilitating the operations described herein. For example, the activities of multiple circuits are combined as a single circuit and implement on the same processing circuit (e.g., the processing circuit 410), as additional circuits with additional functionality are included.

In some arrangements, the computing system 180 includes a processing circuit 410 having a processor 412 and a memory 414. The processor 412 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 414 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 414 is or includes tangible, non-transient volatile memory or non-volatile memory. Accordingly, the memory 414 includes database components, object code components, script components, or any other type of information structure for supporting the various activities and information structures described herein.

The network interface 416 is configured for and structured to establish a connection with the user device 110 and the RBOID verification system 140 via the network 120. The network interface 416 is structured for sending and receiving data over a communication network (e.g., the network 120). Accordingly, the network interface 416 includes any of a cellular transceiver (for cellular standards), local wireless network transceiver (for 802.11X, ZigBee, Bluetooth, Wi- Fi, or the like), wired network interface, a combination thereof (e.g., both a cellular transceiver and a Bluetooth transceiver), and/or the like.

The application circuit 418 is executed by the processing circuit 410, in some arrangements. The application circuit 418 can manage various applications stored within the memory 414 and executed by the processor 412, where the various applications are configured to perform different functions. For example, the application circuit 418 can manage one application configured to send instructions to a bank to release funds for payroll distribution, another application configured to store and categorize various financial transactions for tax purposes, and yet another application configured to maintain network security. The application circuit 418 can allow access to the various applications based on a RBOID provided by the user device 110. After allowing access to one or more applications, the application circuit 418 allows the user device 110 to modify the one or more applications based on the RBOID provided.

Figure 5:
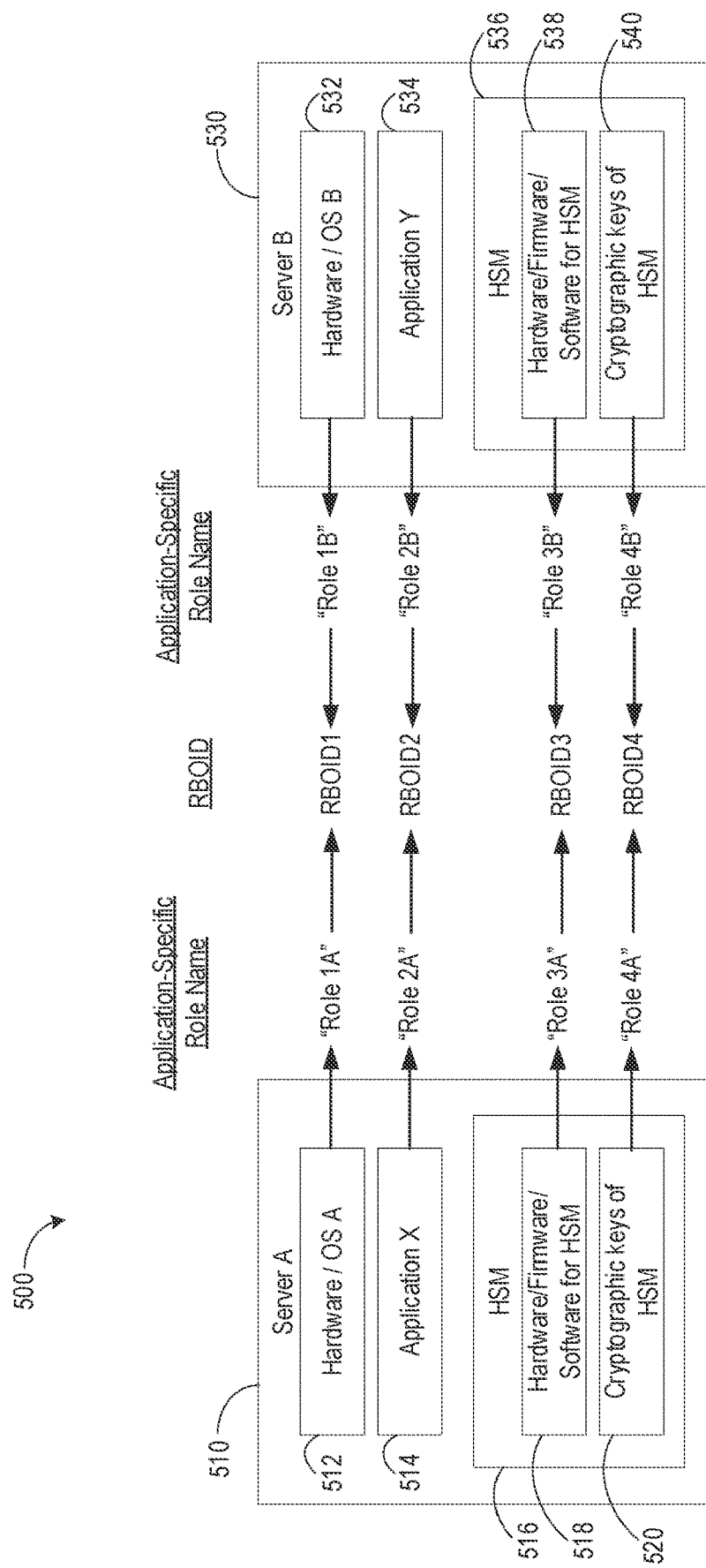
FIG. 5 is an illustration of the relationship between various RBOIDs and various example roles, according to various arrangements.

FIG. 5 is an illustration of the relationship between various RBOIDs and various example roles, according to various arrangements. As shown, a server A 510 includes a hardware/operating system (OS) A 512, an application X 514, and a hardware security module (HSM) 516. A server B 530 includes a hardware/OS B 532, an application Y 534, and a HSM 538.

The server A 510 can be any type of device or system that provides functionality for other programs or devices. Examples of the server A 510 include, but are not limited to, a print server (e.g., the server A 510 may manage one or more printers), a network server (e.g., the server A 510 may manage network traffic), and a database server (e.g., the server A 510 may process database queries). In other example, the server A 510 can be any suitable computing device having one or more of the hardware/OS A 512, application X 514, and HSM 516.

The hardware/OS A 512 (hereinafter referred to as "hardware 512") can be any type of device, system, or software that allows the hardware 512 to support the function of the server A 510. In some arrangements, the hardware 512 can include various input devices (e.g., keyboard, mouse, touchscreen, microphone, etc.) that allows a user to provide input. In some arrangements, the hardware 512 can include various output devices (e.g., display, speakers, haptic motors, etc.) that allow the hardware 512 to provide output. The hardware 512 can also include processing devices configured to manipulate various data into information. The hardware 512 can also include storage devices (e.g., dynamic random access memory, static random access memory, etc.) configured to store information. In some arrangements, the hardware 512 includes operating system software (e.g., the software that supports the basic functions of the server A 510, such as managing memory, processes, hardware, and applications).

The application X 514 can be any type of software program supported by the server A 510 and the hardware 512 that provides a specific function for a user. Examples of the application X 514 include, but are not limited to, a web browser, an e-mail program, a word processor, a financial reporting program, HR program, etc.

The HSM 516 can be any type of device or system configured to safeguard and manage digital keys (e.g., key exchange, key encryption, etc.) to maintain security of the server A 510, and includes a hardware/firmware/software 518 (hereinafter referred to as "hardware 518") and one or more cryptographic keys 520 (hereinafter referred to as "cryptographic keys 520"). The hardware 518 can include high strength materials and tamper resistant features to prevent tampering and/or damage. The hardware 518 can also include firmware (e.g., permanent software programmed into a read-only memory configured to control the physical components of the HSM 516) and software (e.g., instructions by which the HSM 516 operates to maintain security of the server A 510).

The cryptographic keys 520 can include a string of data used to lock or unlock cryptographic functions including, but not limited to, authentication, authorization, and encryption. In some arrangements, the cryptographic keys 520 can change over time (e.g., to maintain security, the cryptographic keys 520 can be generated, exchanged, stored, used, destroyed, and/or replaced).

The server B 530 can be any type of device or system that provides functionality for other programs or devices. Examples of the server B 530 include, but are not limited to, a print server (e.g., the server B 530 may manage one or more printers), a network server (e.g., the server B 530 may manage network traffic), and a database server (e.g., the server B 530 may process database queries). In other example, the server B 530 can be any suitable computing device having one or more of the hardware/OS B 532, application Y 534, and HSM 536.

The hardware/OS B 532 (hereinafter referred to as "hardware 532") can be any type of device, system, or software that allows the hardware 532 to support the function of the server B 530. In some arrangements, the hardware 532 can include various input devices (e.g., keyboard, mouse, touchscreen, microphone, etc.) that allows a user to provide input. In some arrangements, the hardware 532 can include various output devices (e.g., display, speakers, haptic motors, etc.) that allow the hardware 532 to provide output. The hardware 532 can also include processing devices configured to manipulate various data into information. The hardware 532 can also include storage devices (e.g., dynamic random access memory, static random access memory, etc.) configured to store information. In some arrangements, the hardware 532 includes operating system software (e.g., the software that supports the basic functions of the server B 530, such as managing memory, processes, hardware, and applications).

The application Y 534 can be any type of software program supported by the server A 530 and the hardware 532 that provides a specific function for a user. Examples of the application Y 534 include, but are not limited to, a web browser, an e-mail program, a word processor, a financial reporting program, HR program, etc.

The HSM 536 can be any type of device or system configured to safeguard and manage digital keys (e.g., key exchange, key encryption, etc.) to maintain security of the server B 530, and includes a hardware/firmware/software 538 (hereinafter referred to as "hardware 538") and one or more cryptographic keys 540 (hereinafter referred to as "cryptographic keys 540"). The hardware 538 can include high strength materials and tamper resistant features to prevent tampering and/or damage. The hardware 538 can also include firmware (e.g., permanent software programmed into a read-only memory configured to control the physical components of the HSM 536) and software (e.g., instructions by which the HSM 536 operates to maintain security of the server A 530).

The cryptographic keys 540 can include a string of data used to lock or unlock cryptographic functions including, but not limited to, authentication, authorization, and encryption. In some arrangements, the cryptographic keys 540 can change over time (e.g., to maintain security, the cryptographic keys 540 can be generated, exchanged, stored, used, destroyed, and/or replaced).

In many entities (e.g., businesses, corporations, etc.), individuals are assigned access to various electronic elements based on the role of the individual. For example, an individual assigned the role of staff engineer in Company A may be assigned access to various computer applications to allow the staff engineer to access the computer applications, but may not be assigned access to modify the computer applications or install additional applications. As another example, an individual assigned the role of system administrator in Company A may be assigned access that allows the system administrator to add, change, or remove applications, but may not be assigned access to manage cryptographic keys.

In some arrangements, a Company A may be associated with the server A 510. Each individual in Company A may be have an identification (e.g., a user ID, password, etc.) that is associated with the role of each individual. Accordingly, when an individual attempts to access an element within the server A 510, the role of the individual associated with the identification of the individual is compared to the level of access required for the element requested. For example, the staff engineer may attempt to open a 3-D modeling software to create a new 3-D model. The role associated with the staff engineer's identification is compared to the level of access required to use the 3-D modeling software. If a determination is made that the staff engineer can access the 3-D modeling software, the software opens for the staff engineer.

The example described above can be generalized, as shown in FIG. 5. For example, Company A may have specific role names assigned to specific roles, with each role having access to different components of the server A 510. Role 1A may be permitted to access the hardware 512, Role 2A may be allowed to access and modify the application X 514, Role 3A may be permitted to change the hardware 518, and Role 4A may be permitted to access and modify the cryptographic keys 520.

A Company B may be associated with the server B 530, and Company B may also have specific role names assigned to specific roles, with each role have access to different components of the server B 530. Role 1B may be permitted to access the hardware 532, Role 2B may be allowed to access and modify the application Y 534, Role 3B may be permitted to change the hardware 538, and Role 4B may be permitted to access and modify the cryptographic keys 540.

For each of the Company A and the Company B, the permissions of each role are created and managed specifically for each role name. In some arrangements, roles that have substantially similar permissions in Company A and Company B may have different role names. For example, Role 1A may be associated with the role name "system administrator" and Role 2A may be associated with the role name "system owner." Accordingly, the server A 510 provides access to the hardware 512 by the system administrator, and the server B 530 provides access to the hardware 532 by the system owner. Configuring the server A 510 and the server B 530 in the manner described may take significant time and resources. Furthermore, entities can change the role names while maintaining the same permissions, thereby requiring additional configuration of the server A 510 and the server B 530 to associated new role names with the desired permissions.

Implementations described herein provide for an RBOID schema where RBOIDs are defined for various levels of access/permissions such that roles with different names across different organizations can be assigned access/permissions based on the RBOID associated with the role. Such an RBOID schema can streamline the process of defining roles and granting access/permissions to those roles.

An example RBOID schema is shown in FIG. 5, where an RBOID for each role across Company A and Company B is provided. For example, the system administrator of Company A has permission to access the hardware 512, and the system owner of Company B has permission to access the hardware 532. Both the system administrator and the system owner have the same level of access based on their respective companies and servers (e.g., the server A 510 and the server B 530). However, each of the server A 510 and the server B 530 is customized to grant access/permissions to each role associated with the respective server. Implementing the RBOID schema described herein eliminates the need to customize each server to grant access/permissions. Instead, roles across the entities are associated with the RBOID that grants the role the desired access.

For example, instead of creating specific access/permissions for Role 1A specific to the server A 510, Role 1A can be associated with RBOID1, where RBOID1 indicates access/permission to the hardware 512. Similarly, instead of creating specific access/permissions for Role 2A specific to the server B 530, Role 2A can be associated RBOID1, where RBOID1 indicates access/permission to the hardware 532. Similar associations can be made across various roles and various entities. For example, the RBOID schema can include additional RBOIDs (e.g., RBOID2, RBOID3, RBOID4, etc.) associated with various roles that indicate the access/permissions associated with those roles.

Furthermore, various applications used by a single entity (e.g., Company A) may define different role names that provide for substantially similar access/permissions. The RBOID schema described herein allows a single entity to associate roles within the entity with RBOIDs defined by the RBOID schema. The RBOID schema described herein also allows the roles within the various applications to be associated with RBOIDs defined by the RBOID schema such that a single schema (e.g., the RBOID schema) can be used across various entities and applications to streamline the process of granting or denying access.

In operation, the RBOID schema described herein can support an individual with one role, an individual with multiple roles, multiple individuals with the same role, and multiple individuals with multiple roles. For example, a small company may have one individual responsible for maintaining various applications and the overall operating system. The individual may have one user ID associated with one assigned role name (e.g., "IT administrator," "system administrator," etc.) but have responsibility for various elements. To provide such access in the context of the RBOID schema, the user ID can be associated with more than one RBOID (e.g., RBOID1 and RBOID2) such that access/permission can be granted to the desired elements. Furthermore, the small company may have one individual responsible for maintaining the HSM. The individual may have one user ID associated with one assigned role name (e.g., "IT security officer," "security manager," etc.) but have access to various elements of the HSM (e.g., the HSM software and the cryptographic keys). To provide such access in the context of the RBOID schema, the single assigned role name can be associated with more than one RBOID (e.g., RBOID3 and RBOID4) such that access/permission can be granted to the desired HSM elements.

In some arrangements, for security purposes an individual that fulfills multiple roles may have multiple user IDs, with each user ID associated with one of the multiple roles. For example, an individual may have roles corresponding to a system administrator and a security manager. To perform actions related to the system administrator role, the individual may have a first user ID associated with the system administrator role. To perform actions related to the security manager role, the individual may have a second user ID associated with the security manager role.

FIG. 6 is an illustration of the format of various role-based OIDs, according to various arrangements. Different object identifier naming conventions are implemented by different organizations. For example, the International Standards Organization (ISO) has implemented an OID tree that is represented by a series of integers separated by periods, and the integers correspond to the path from the root to the entity. As another example, the International Telecommunications Standardization Sector has also implemented an OID convention, commonly referred to as the X-9 convention, which also includes a series of integers separated by periods. In some instances, an OID can be a combination of the ISO and X-9 conventions, referred to as a joint ISO-ITU convention. For example, the OID for an individual in Company X under the joint ISO-ITU convention is 2.16.840.1.114171.n, where "2" indicates the joint convention, "16" indicates a country, "840" indicates the United States, "1" indicates an organization, "114171" indicates Company X, and "n" indicates a number assigned to a particular individual within Company X. Implementing such conventions can provide for any entity having a unique number such that, when granting permissions to access various elements, the individual requesting permission is uniquely identified.

As shown, an X-9 RBOID 602 includes various identifying numbers that conform to the X-9 convention, with the first number indicating that the number is an X-9 RBOID, various additional numbers corresponding to other identifying elements as described, and "n" corresponding to an individual within an organization, where "n" can be any number and no two individuals within an organization have the same number.

Similarly, an ISO RBOID 604 includes various identifying numbers that conform to the ISO convention, with the first number indicating that the number is an ISO RBOID, various additional numbers corresponding to other identifying elements as described, and "n" corresponding to an individual within an organization, where "n" can be any number and no two individuals within an organization have the same number.

Also, a JOINT RBOID 606 includes various identifying numbers that conform to the JOINT-ISO-ITU convention, with the first number indicating that the number is a JOINT-ISO-ITU RBOID, various additional numbers corresponding to other identifying elements as described, and "n" corresponding to an individual within an organization, where "n" can be any number and no two individuals within an organization have the same number.

Furthermore, a COMPANY-RBOID 608 is a RBOID schema specific to an entity and does not conform to the identifying conventions described. The COMPANY-RBOID 608 may be generated by an entity where the COMPANY-RBOID 608 can be mapped to any of the X-9 RBOID 602, the ISO RBOID 604, or the JOINT RBOID 606, and vice versa. Such a mapping can provide an entity with the ability to use the RBOID schema described herein without requiring the entity specific schema to be discarded.

Mapping can be accomplished in a variety of ways. As an example, a database may be created that includes the various role names associated with an entity and the corresponding role names associated with the RBOID schema. A lookup table can be used to map (e.g., convert) the entity specific OID to the RBOID schema so as to provide access and permissions equivalent to the RBOID schema.

FIG. 7 is an illustration of a table 700 of various example RBOIDs and the roles to which they correspond, according to various arrangements. The table 700 is shown for purposes of example, as there may be many additional RBOIDs within the RBOID schema described herein. As shown, the role of information technology (IT) administrator is assigned to RBOID(3). An IT administrator may be responsible for maintaining an entity's IT network and servers. The role of system (SE) administrator is assigned to RBOID(4). A system administrator may be responsible for configuring the operating system and associated hardware. The role of information security (IS) administrator is assigned to RBOIDS(5). An IS administrator may be responsible for managing all IT-related security and safety issues within an entity, and can include developing systems and policies to maintain security. The role of user is assigned to RBOIDS (6). A user may be an individual within an entity whose role is not related to IT (e.g., finance, marketing, manufacturing, etc.).

Each individual within an entity may have a digital certificate associated with that individual. The digital certificate may include various information, including one or more RBOIDs associated with each individual. When the individual attempts to access elements specific to the individual's role by presenting the individual's user ID, the digital certificate associated with the user ID is analyzed to determine whether the individual is associated with an RBOID that would allow access or permission.

As described, in some arrangements one individual may be associated with multiple RBOIDs based on various roles the individual fills. However, in some arrangements there can be rules associated with the RBOID schema such that a single user ID may be prevented from being associated with multiple RBOIDs. For example, one individual may have a first user ID associated with RBOID(3). For security purposes, the first user ID cannot be associated with a second RBOID, even if the individual fulfills multiple roles. Therefore, for the user to be granted access for various roles, the user has multiple user IDs, with each user ID associated with a different RBOID.

Figure 8:
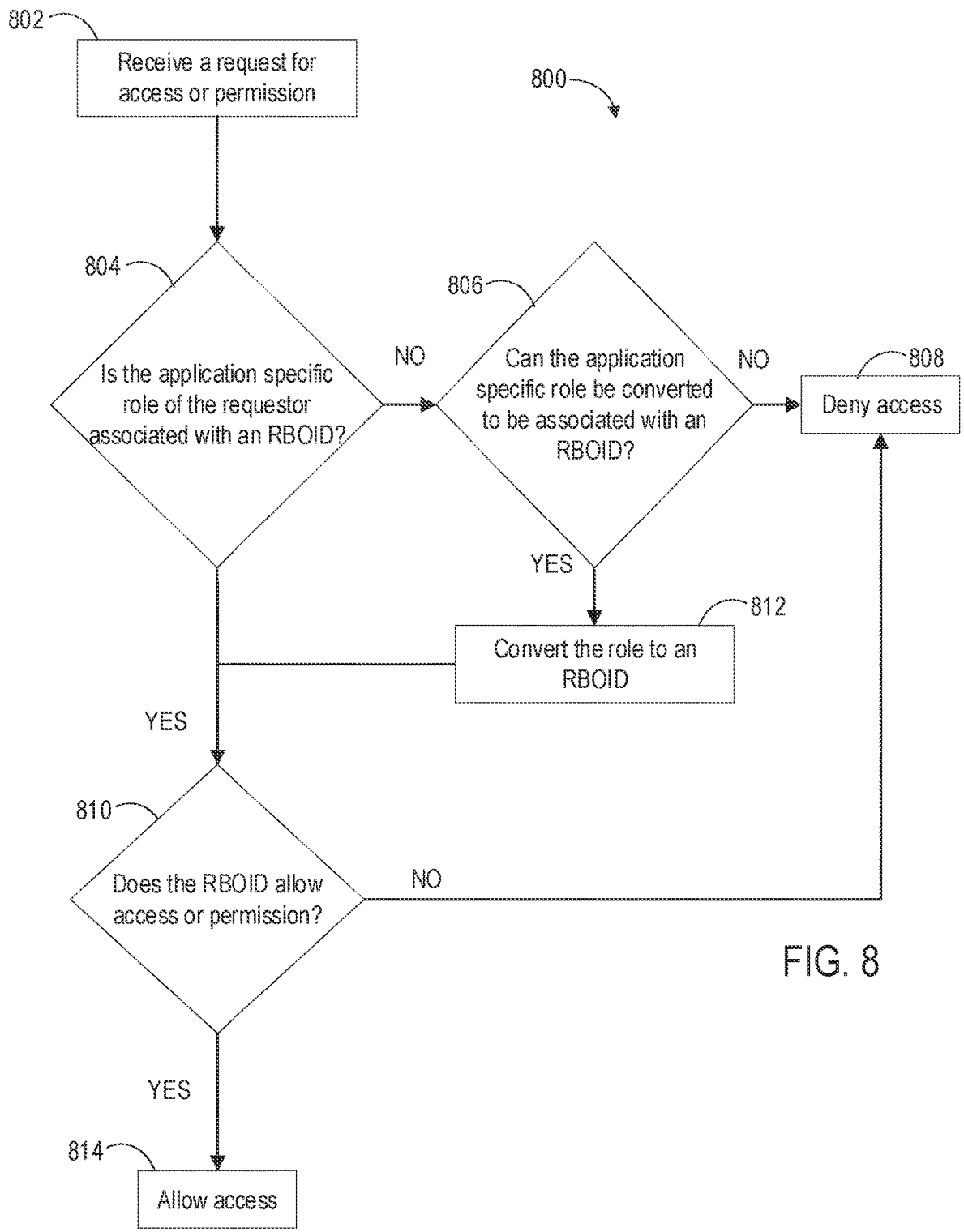
FIG. 8 is a flow diagram illustrating a method for providing access to an application based on RBOIDs, according to various arrangements.

FIG. 8 is a flow diagram illustrating a method 800 for providing access to an application based on role-based OIDs, according to various arrangements. Referring to FIGS. 1-7, the method 800 is executed by the user device 110, the RBOID verification system 140, and the computing system 180, in some arrangements.

At 802, a request is received for access or permission. In some arrangements, the request can be directed to any of various hardware and/or software systems or applications. The request may be generated by an individual, where the individual attempts to access with the user device 110. The user device 110 communicates with the computing system 180 and requests access or permission.

At 804, a determination is made as to whether the application-specific role of the requestor is associated with an RBOID. In some arrangements, the computing system 180 receives the request from the user device 110 and provides information regarding the request to the RBOID verification system 140. The information provided can include the user ID of the individual making the request, the role name of the individual making the request, and an RBOID associated with the user ID.

If the RBOID verification system 140 determines that the user ID making the request is associated with an RBOID, at 810 a determination is made as to whether the RBOID associated with the user ID provides the requested level of access or permission. In some arrangements, the RBOID associated with the user ID does not provide the requested level of access or permission (e.g., the RBOID presented provides access to a specific application, but the request is directed to accessing an operating system of a server). In such arrangements, at 808 access is denied.

In some arrangements, the RBOID associated with the user ID does provides the requested level of access or permission (e.g., the RBOID presented provides access to a specific application, and the request is directed to that specific application). In such arrangements, at 814 access is granted.

Returning to 804, if a determination is made that the user ID making the request is not associated with an RBOID, at 806 a determination is made as to whether the application-specific role associated with the user ID can be converted to be associated with an RBOID. In some arrangements, the determination is made by one or more of the user device 110, the RBOID verification system 140, and the computing system 180. To determine whether the application-specific role associated with the user ID can be converted to be associated with an RBOID, in some arrangements a lookup table is used. If the determination is made that the application-specific role associated with the user ID cannot be converted to be associated with an RBOID and, at 808, access is denied. If the determination is made that the application-specific role associated with the user ID can be converted to an RBOID, at 812 the role associated with the user ID is converted to an RBOID. At 810, a determination is made as to whether the RBOID allows access or permission, as described.

Though the method 800 describes a single access/permission request, the method 800 can be applied to multiple access/permission requests by one or more individuals associated with one or more user IDs.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   receiving, by a computing system, a first request from a user to access or modify a first application of a server comprising cryptographic keys, the first request comprising a first role-based object identifier (RBOID) identifying a first role of the first user and a second RBOID identifying a second role of the user different from the first role, the first RBOID associated with a first user identifier of the user and the second RBOID associated with a second user identifier of the user,
   wherein, based on rules of an RBOID schema defining the first RBOID and the second RBOID, the first RBOID is prevented from being associated with the second user identifier and the second RBOID is prevented from being associated with the first user identifier;
   determining, by the computing system, whether a first application-specific role is configured to be converted to be equivalent to the first RBOID; and
   in response to determining that the first application-specific role corresponds to security management, permitting, by the computing system, the user to access the cryptographic keys.

2. The method of claim 1, wherein the first RBOID is equivalent to a second application-specific role for a second application different from the first application.

3. The method of claim 2, further comprising receiving, by the computing system, a second request from a second user to access or modify the second application, the second request comprising the first RBOID, the first RBOID identifying a role of the second user.

4. The method of claim 3, further comprising, in response to determining that the first RBOID is equivalent to the second application-specific role, authorizing, by the computing system, the second request.

5. The method of claim 1, further comprising:
   in response to determining that the first RBOID is inequivalent to the first application-specific role, determining, by the computing system, whether the first RBOID can be converted to be equivalent to the first application-specific role;
   in response to determining that the first RBOID can be converted to be equivalent to the first application-specific role, converting, by the computing system, the first RBOID to be equivalent to the first application-specific role; and
   authorizing, by the computing system, the first request.

6. The method of claim 5, further comprising, in response to determining that the first RBOID cannot be converted to be equivalent to the first application-specific role, denying, by the computing system, the first request.

7. The method of claim 1, wherein the first application-specific role being converted to be equivalent to the first RBOID comprises mapping, by the computing system, the first application-specific role to the RBOID schema.

8. A method, comprising:
   receiving, by a computing system, a first request from a user to access or modify a first application of a server comprising cryptographic keys, the first request comprising a first role-based object identifier (RBOID) identifying a first role of the first user and a second RBOID identifying a second role of the user different from the first role, the first RBOID associated with a first user identifier of the user and the second RBOID associated with a second user identifier of the user, wherein, based on rules of an RBOID schema defining the first RBOID and the second RBOID, the first RBOID is prevented from being associated with the second user identifier and the second RBOID is prevented from being associated with the first user identifier;

receiving, by the computing system, a second request from the user to access or modify a second application, the second request comprising the second RBOID;

determining, by the computing system, whether the first role is configured to be converted to a first application-specific role; and in response to determining that the first application-specific role corresponds to security management, permitting, by the computing system, the user to access the cryptographic keys.

9. The method of claim 8, further comprising, in response to determining that the user is permitted to access the first application and the second application, allowing, by the computing system, the user access to the first application and the second application.

10. The method of claim 8, further comprising:
determining, by the computing system, whether the first RBOID is equivalent to the first application-specific role;
determining, by the computing system, whether the second RBOID is equivalent to a second application-specific role; and
in response to determining that the first RBOID is inequivalent to the first application-specific role, determining, by the computing system, whether the first RBOID can be converted to be equivalent to the first application-specific role.

11. The method of claim 10, further comprising, in response to determining that the first RBOID can be converted to be equivalent to the first application-specific role, converting, by the computing system, the first RBOID to be equivalent to the first application-specific role.

12. The method of claim 8, wherein determining whether the user is permitted to access the first application and the second application comprises analyzing a digital certificate, the digital certificate comprising the first RBOID.

13. A non-transitory computer readable media having computer-executable instructions embodied therein that, when executed by at least one processor, cause a computing system to execute a schema, the schema comprising:
a first role-based object identifier (RBOID) and a second RBOID, the first RBOID corresponding to a first application-specific role and a second application-specific role, the first RBOID identifying a first role of a user and the second RBOID identifying a second role of the user different from the first role, the first RBOID associated with a first user identifier of the user and the second RBOID associated with a second user identifier of the user, wherein, based on rules of an RBOID schema defining the first RBOID and the second RBOID, the first RBOID is prevented from being associated with the second user identifier and the second RBOID is prevented from being associated with the first user identifier, and wherein the first RBOID and the second RBOID are received in a first request from the user to access or modify a first application of a server comprising cryptographic keys;

determine whether the first application-specific role is configured to be converted to be equivalent to the first RBOID; and in response to determining that the first application-specific role corresponds to security management, permit, by the computing system, the user to access the cryptographic keys.

14. The non-transitory computer readable media of claim 13, wherein the first application-specific role is associated with the first application and the second application-specific role is associated with a second application.

15. The non-transitory computer readable media of claim 14, wherein access to the first application and the second application is granted based on providing the first RBOID to the first application and the second application.

16. The non-transitory computer readable media of claim 13, wherein the first application-specific role and the second application-specific role correspond to a first permission level.

17. The non-transitory computer readable media of claim 16, wherein:
the second RBOID corresponds to a third application-specific role and a fourth application-specific role, and
the third application-specific role is associated with a third application, and the fourth application-specific role is associated with a fourth application.

18. The non-transitory computer readable media of claim 17, wherein the third application-specific role and the fourth application-specific role correspond to a second permission level, the second permission level being different than the first permission level.

19. The non-transitory computer readable media of claim 18, wherein access to the third application and the fourth application is granted based on providing the second RBOID to the third application and the fourth application.

20. The non-transitory computer readable media of claim 13, wherein the first application-specific role being converted to be equivalent to the first RBOID comprises mapping, by the computing system, the first application-specific role to the RBOID schema.

* * * * *